United States Patent

Presby

[11] 3,879,128
[45] Apr. 22, 1975

[54] METHOD AND APPARATUS FOR MEASURING THE REFRACTIVE INDEX AND DIAMETER OF OPTICAL FIBERS

[75] Inventor: Herman Melvin Presby, Highland Park, N.J.

[73] Assignee: Bell Telephone Laboratories, Incorporated, Murray Hill, N.J.

[22] Filed: Aug. 15, 1973

[21] Appl. No.: 388,455

[52] U.S. Cl. .......................... 356/73; 65/2; 65/13; 65/29; 65/158; 65/163; 250/571; 356/107
[51] Int. Cl. .................. G01n 21/00; G01n 21/18; G01n 21/30
[58] Field of Search ............ 356/73, 107, 108, 159, 356/160, 168, 199, 200, 239; 250/559, 560, 571; 65/29, 158, 163, 2, 13; 350/96 R, 96 B

[56] References Cited
UNITED STATES PATENTS

| | | | |
|---|---|---|---|
| 3,088,297 | 5/1963 | Kapany et al. | 350/96 R |
| 3,659,950 | 5/1972 | Troll et al. | 356/199 |
| 3,709,610 | 1/1973 | Kruegle | 356/160 |

Primary Examiner—Vincent P. McGraw
Attorney, Agent, or Firm—S. Sherman

[57] ABSTRACT

A method is disclosed for monitoring and controlling the refractive index profile and the diameter of optical fibers. The technique is based upon an analysis of the backscattered radiation produced when an optical beam impinges upon the fiber. It can be shown, by a geometrical optical analysis, that the position of a sharp cutoff in the radiation pattern is a function of the refractive index profile while the distance between two successive minima (or maxima) is a function of the fiber diameter. For certain simple fiber configurations, this data can be translated directly into a number for the fiber core index and a number for the fiber core diameter. For more complicated fiber configurations, such as fibers having graded-index cores, the resulting radiation pattern can be compared to that of a reference fiber, and any unusual deviations noted. The method is advantageously used in conjunction with a feedback system for monitoring fibers as they are drawn, and for controlling the drawing machinery so as to maintain the fiber parameters within specified tolerances.

8 Claims, 11 Drawing Figures

PATENTED APR 22 1975          3,879,128

ND APPARATUS FOR MEASURING
METHOD AND APPARATUS FOR MEASURING THE REFRACTIVE INDEX AND DIAMETER OF OPTICAL FIBERS

This invention relates to methods for optically measuring the transverse dimensions and refractive index of transparent filaments, such as optical fibers.

BACKGROUND OF THE INVENTION

Fibers, currently being considered use as the transmission medium in optical communication systems, typically comprise two concentric dielectric cylinders of relatively long length (i.e., anywhere from several meters to many kilometers), and relatively small external diameter (i.e., ~ 100 microns). The inner cylinder, called the core, is composed of a transparent material whose refractive index is slightly larger than that of the outer protective cylinder, called the cladding.

The diameter of the core, and the refractive indices of the core and cladding are the basic parameters which completely specify the transmission characteristics of the fiber. Thus, it is very important that these parameters are carefully controlled as the fiber is manufactured. This can involve maintaining them as uniform as possible or, alternatively, can include certain predefined variations. Accordingly, a simple, nondestructive technique for measuring the refractivity and diameter of optical fibers is required. The technique could then be used as an on-line system for monitoring and regulating these properties as the fiber is drawn during its production stage. It could also be used to inspect fibers prior to their installation. Finally, it would facilitate the evaluation and study of fibers in the laboratory, relating changes in these parameters to observable transmission characteristics.

SUMMARY OF THE INVENTION

The present invention is based upon the discovery that the intensity distribution of the backscattered radiation pattern obtained when a CW laser beam is incident upon a fiber includes information about the refractive index and the cross-sectional dimensions of the fiber. In particular, it was found that the overall size of the principal portion of the intensity distribution is related to the refractive index, whereas the spacing between adjacent intensity minima (or maxima) is a function of the fiber diameter. Accordingly, one method for measuring the parameters of transparent filaments, such as optical fibers, comprises the steps of: illuminating said filament with a beam from a narrowband signal source; converting the intensity variations of the backscattered radiation pattern obtained from said filament into a time-varying optical signal; converting said time varying optical signal into a time-varying electrical signal; measuring selected time intervals of said electrical signal.

In an alternate method, the backscattered radiation pattern is converted directly to a time-varying electrical signal.

It is an advantage of the present invention that it provides a continuous nondestructive means of monitoring the fiber parameters during the fiber production stage, and a means for automatically controlling these parameters.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
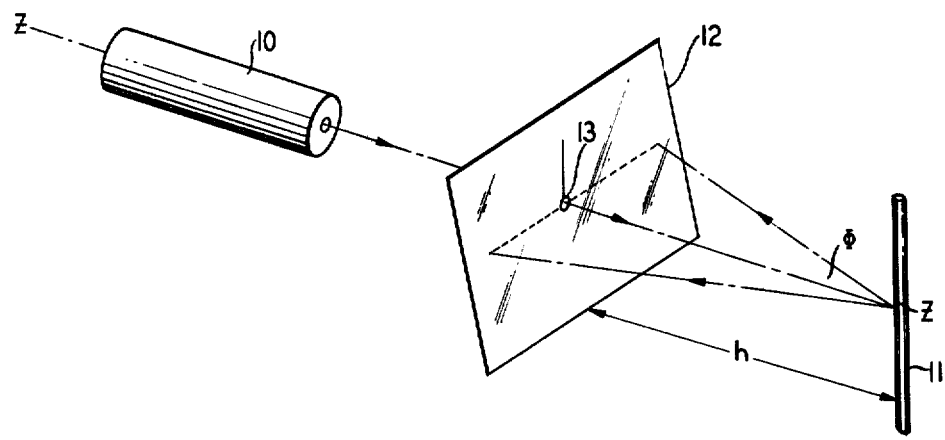
FIG. 1 shows an arrangement for obtaining the backscattered radiation pattern from an optical fiber.

Referring to the drawings, FIG. 1 shows an arrangement for obtaining the backscattered radiation pattern from an optical fiber comprising a narrowband signal source 10, such as a CW laser, an opaque viewing screen 12, and the fiber to be measured 11. The incident radiation passes through an aperture 13 in viewing screen 12, and impinges upon the fiber. The backscattered radiation falls on the same screen and can be viewed directly.

Figure 2:
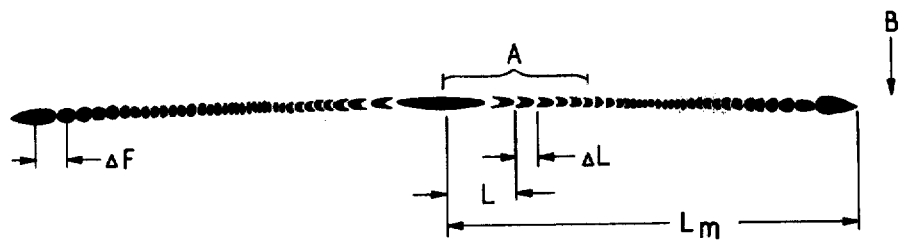
FIG. 2 shows a typical backscattered radiation pattern.

FIG. 2, included for purposes of explanation shows a typical backscattered radiation pattern. The complete pattern is localized in a region of angular dimension of the order of $\Phi=\pm 20°$ from the incident beam direction $z-z$. Thus, if the fiber is approximately 10 centimeters from the screen, the dimension $L_m$ is typically 36 millimeters. Beyond this point there is a sharp cutoff in the radiation intensity, and the pattern becomes a low level continuum over the region B. Over the interval $L_m$ there is a series of fringes whose spacings, $\Delta L$, decrease as one progresses from the center of the pattern ($\Phi=0°$) outward towards region B. However, inasmuch as the fringe pattern is sharpest at the center (region A), observations and measurements made along the inner fringe are advantageously made along region A.

Figure 3:
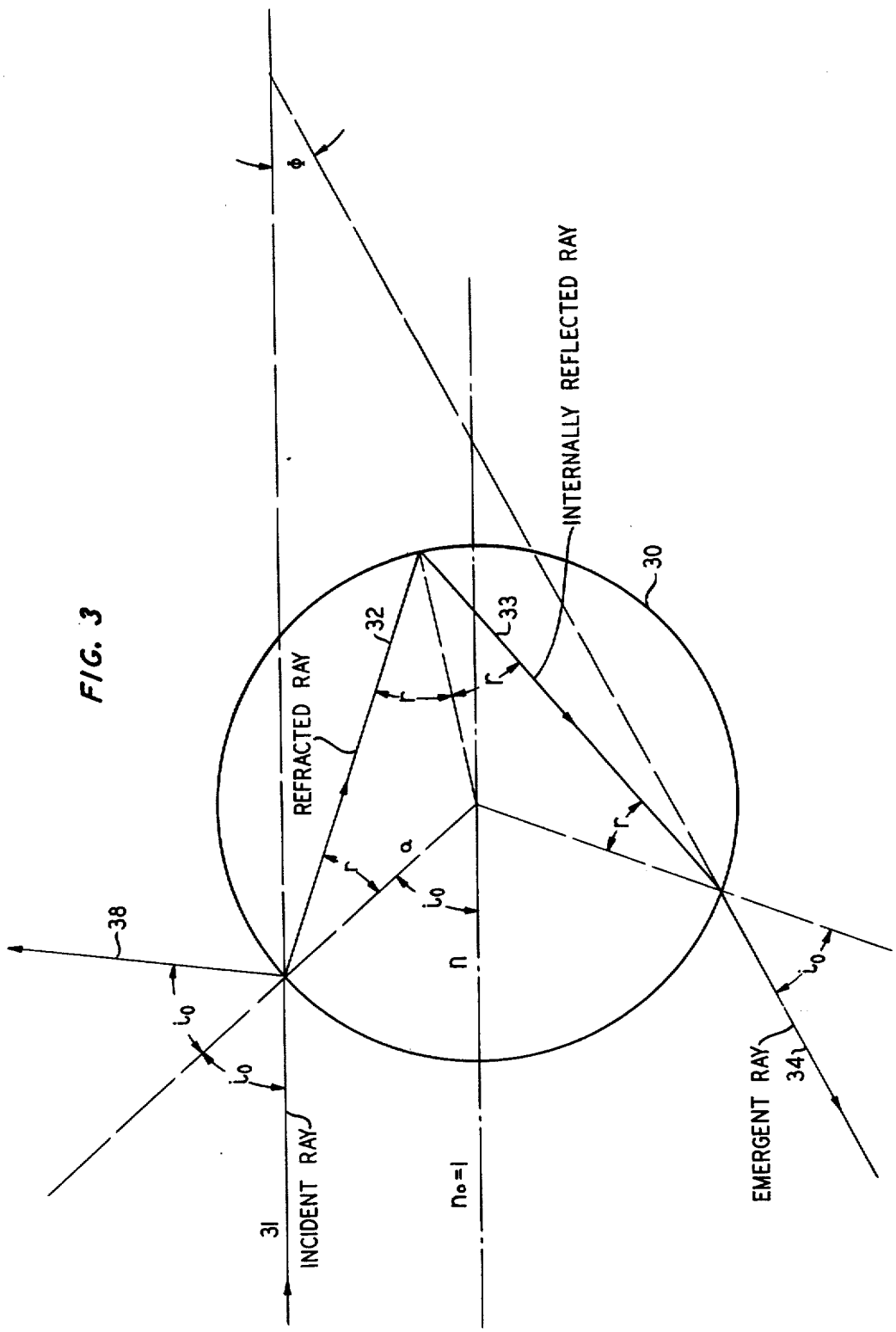
FIGS. 3 and 4, included for purposes of explanation, show the ray paths for producing the radiation pattern illustrated in FIG. 2.

The problem to which the present invention addresses itself is the extraction of the fiber's radius, $a$, and refractive index, $n$, from the above-described intensity distribution. In particular, it can be shown by a geometrical optics analysis that the refractive index of the fiber is uniquely determined by the position of the sharp cutoff, $L_m$, and that the fiber radius is defined by the spacing between adjacent fringes, $\Delta L$, and by the spacing between the two outermost intensity peaks, $\Delta F$. It can also be shown that the above-described intensity distribution is produced by two distinctly different effects. The first of these effects, which provides information about the refractive index of the fiber material, and can also provide information about the fiber radius, has to do with the way in which light, which enters the fiber, is reflected back towards the source. This is illustrated in FIG. 3 which shows a cross section of a fiber 30, of refractive index $n$ and radius $a$, and the path of an incident ray 31. The latter, which impinges upon the fiber at an incident angle $i_o$, is partially reflected. The energy associated with the reflected ray 38 is lost. The balance of the incident ray enters the fiber as a refracted ray 32. The latter ray is reflected at the fiber air interface, producing an internally reflected ray 33. A component of the latter emerges from the fiber in the backward direction as emergent ray 34. When the ray trajectory for a plurality of incident rays is traced in this manner, it is found that the emergent rays tend to bunch about a particular angle $\Phi_m$ to the incident beam given by $$\Phi_m = 4 \sin^{-1}\left[\frac{2}{n}\frac{}{3}\left(1 - \frac{n^2}{4}\right)^{1/2}\right] - 2\sin^{-1}\left[\frac{2}{3}\left(1 - \frac{n^2}{4}\right)^{1/2}\right] \quad (1)$$

The resulting bright spot produced by the emerging rays on the viewing screen will then appear at a point $L_m$ off axis by an amount $$L_m = h \tan \Phi_m, \quad (2)$$

where $h$ is the distance between the screen and fiber.

It will be noted that the location of the intensity maximum is independent of the fiber diameter, and depends solely upon the refractive index of the fiber material. (Light polarized parallel to the fiber axis is advantageously used for this measurement since light polarized normal to the fiber axis produces an intensity minimum at an angle very close to $\Phi_m$.)

The same rays which form the large intensity peak at $L_m$, also produce an interference pattern which is a function of the fiber radius. To determine the radius, the distance, $\Delta F$, between the intensity maximum and the next adjacent intensity peak is measured. This distance, $\Delta F$, is related to the fiber radius $a$ by $$\Delta F = h \tan\left[2.1 \times 10^3 \left(\frac{H}{48}\right)^{1/3} \left(\frac{\lambda}{a}\right)^{2/3}\right] \quad (3)$$

where $$H = \frac{9(4-n^2)^{1/2}}{4(n^2-1)^{3/2}}; \quad (4)$$

$a$ is the fiber radius;
$h$ is the distance between the viewing screen and the fiber;
$\lambda$ is the wavelength of the incident wave;
and $n$ is the refractive index of the fiber material.

It will be noted that the refractive index $n$ is a parameter in equation (4). Accordingly, $n$ must be either known, or must first be determined by means of equations (1) and (2), and then used to compute H. Thus, the above-described measurements can be used to determine the refractive index and diameter of an unclad optical fiber or, more generally, any transparent rod.

Figure 4:
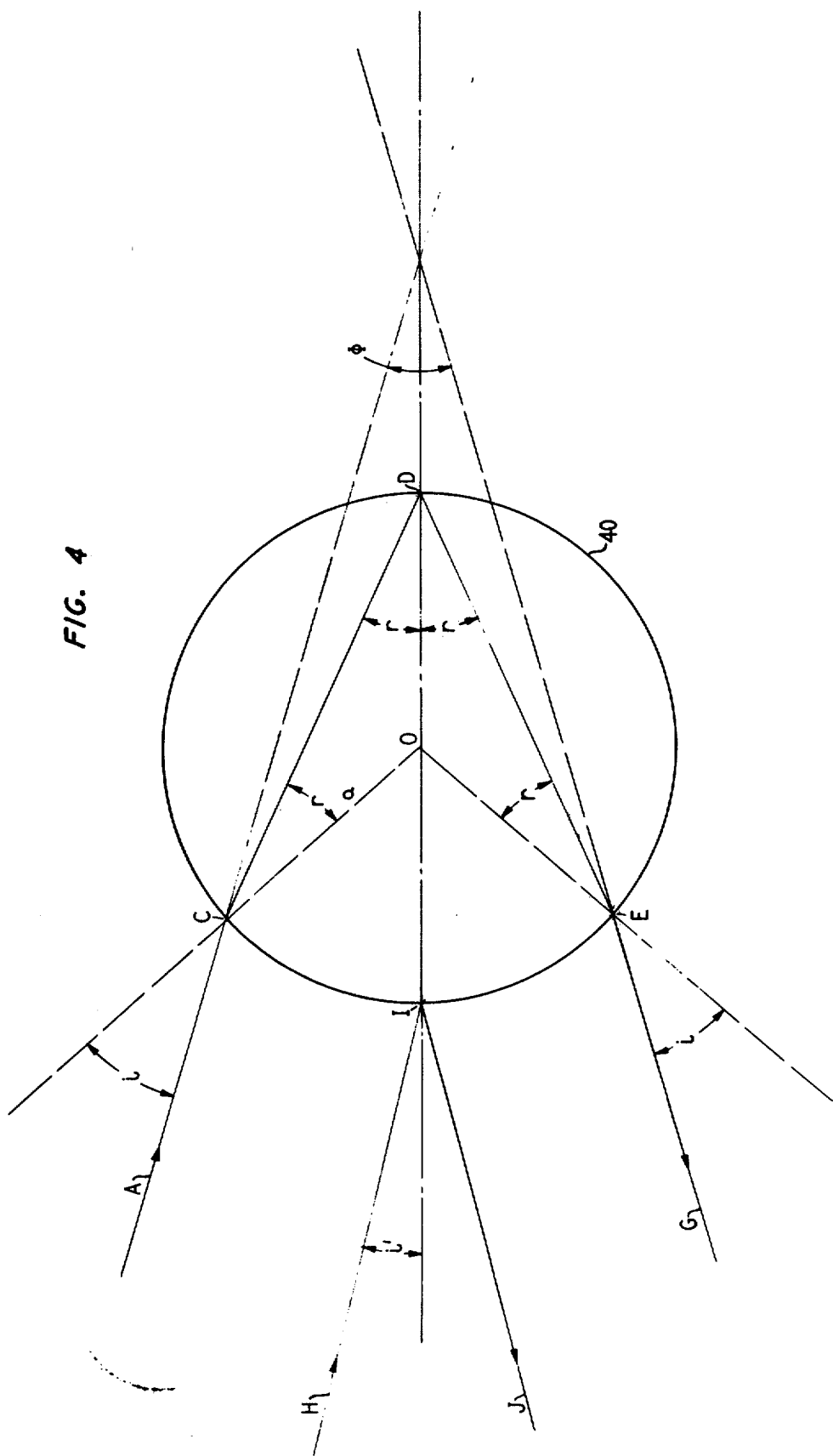

FIG. 4, now to be considered, shows the relevant rays to be considered in connection with an alternate means for determining the fiber radius. In particular, consider the two rays AC and HI, coming from the same source and incident upon fiber 40 at angle $i$ and $i'$, respectively. Ray AC, after being refracted at the front surface and reflected at point D on the rear surface emerges at E. The portion of the ray which is externally reflected at C, and also that portion which is internally reflected at E are lost. Ray HI is reflected at I on the front surface at an angle of $i'$, while the portion of HI entering the fiber is similarly lost. If $$i' = \frac{\pi - \theta}{2} = 2r - i, \quad (5)$$

the two rays IJ and EG will interfere. The resulting interference pattern from many such groups of rays gives rise to that portion of the backscattered pattern labeled A in FIG. 2. The space $\Delta L$ between adjacent minima (or maxima) is given by $$\Delta L = \frac{2\lambda}{a} \frac{h^2}{L}(1-n/2). \quad (6)$$

Solving equation (6) for $a$, one obtains $$a = \frac{2\lambda h^2}{L(\Delta L)}(1-n/2), \quad (7)$$

where L is the distance from the center of the backscattered radiation pattern to the first minimum (or maximum);

and the other parameters are as defined above.

It will be again noted that the index $n$ must be predetermined before $a$ can be calculated.

Figure 5:
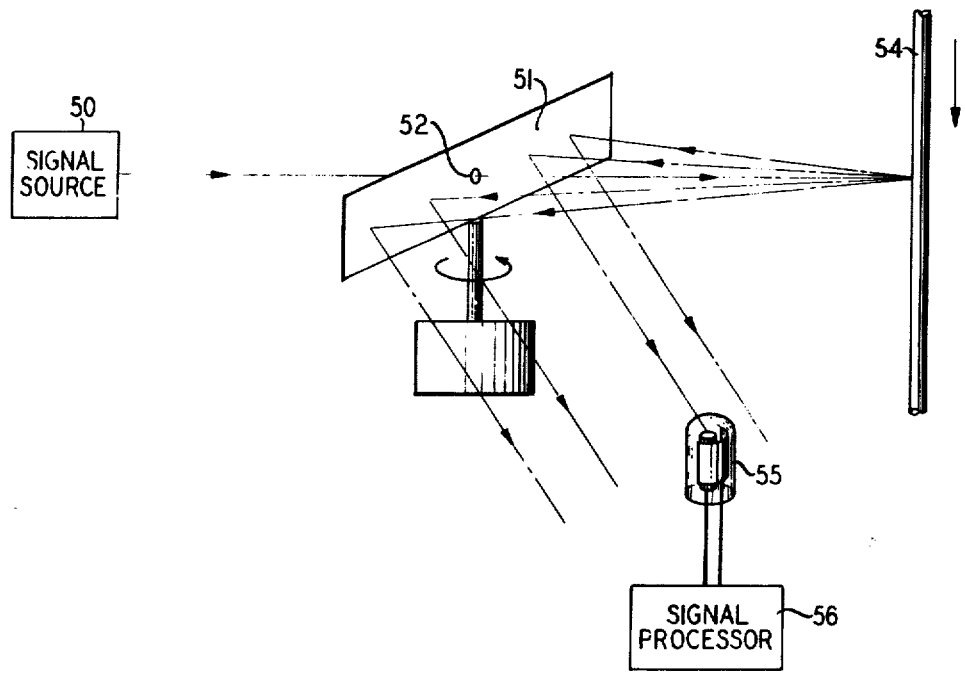
FIGS. 5, 6 and 7 illustrate apparatus for automatically computing the parameters of an optical fiber from the radiation pattern of FIG. 2.
Figure 6:
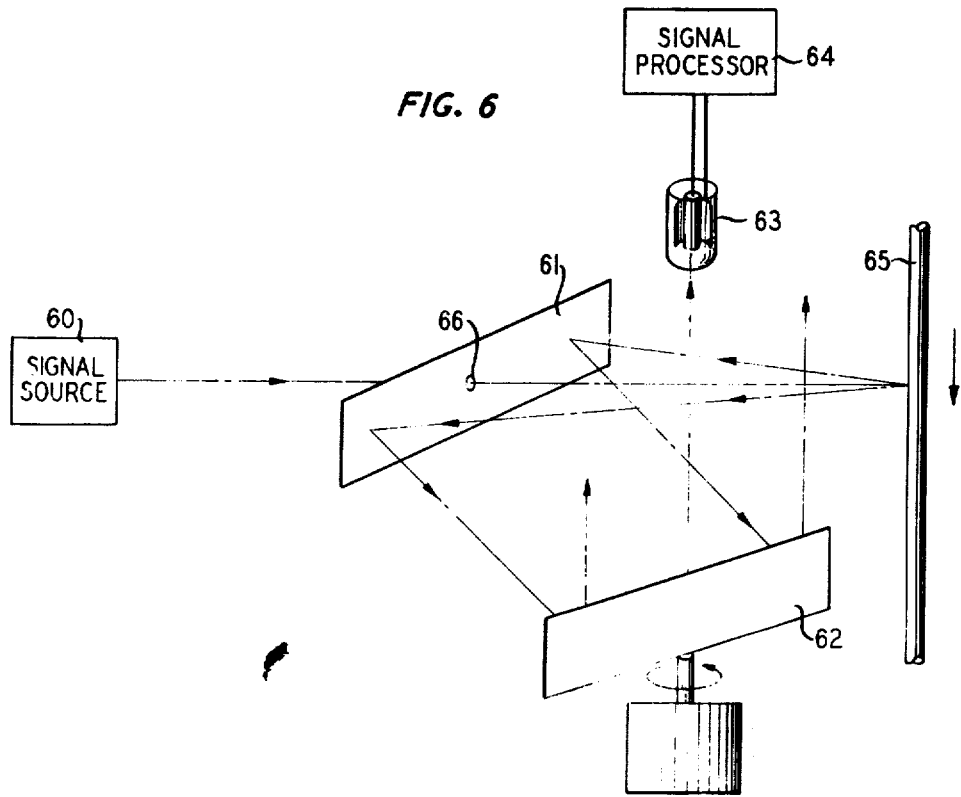
Figure 7:
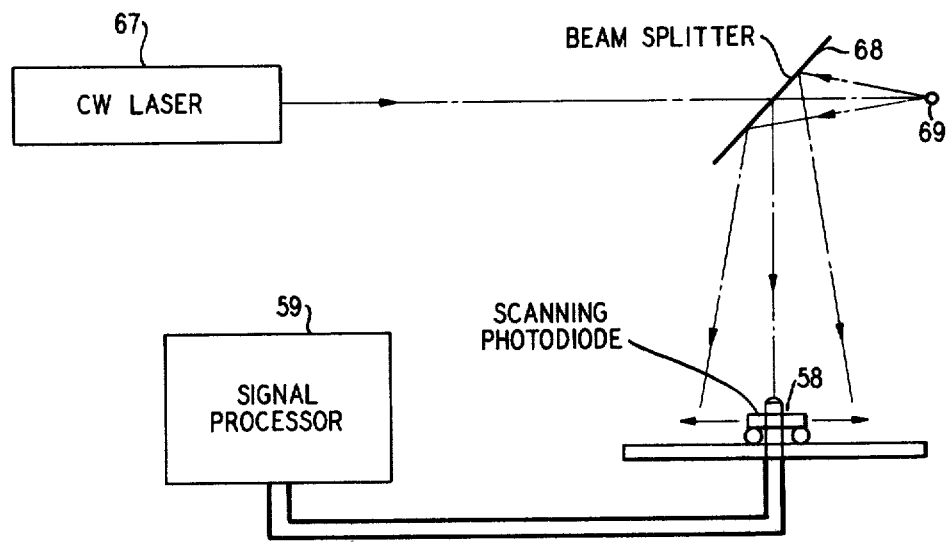

FIGS. 5, 6 and 7, now to be described, illustrate apparatus for automatically measuring or monitoring the refractive index and diameter of an unclad fiber such as might be used during its manufacture, or for inspection purposes. The first of these embodiments, illustrated in FIG. 5, comprises a signal source 50, a rotating mirror 51 along whose axis of rotation $z—z$ there is an aperture 52; photoresponsive means 55; and a signal processor 56.

In operation, a beam of radian energy from signal source 50, which can be a CW laser or other comparable monochromatic source, is directed through the aperture 52 in mirror 51 and onto fiber 54. The latter can be either stationary or moving as indicated by the arrow adjacent to fiber 54. The resulting backscattered radiation pattern is reflected onto photoresponsive means 55 by the rotation of mirror 51. The photoresponsive means converts the incident radiant energy into electrical signals which are, in turn, coupled to signal processor 56. It will be noted that by using a mirror as a viewing screen and rotating it, an electrical signal is produced whose intensity variations, as a function of time, correspond to the spatial intensity variations of the backscattered radiation pattern.

Details of the signal processor 56 will vary depending upon the particular application to which the signals are to be put. Examples of specific processors will be given in greater detail hereinbelow.

FIG. 6 is a variation of the basic structure shown in FIG. 5. It will be noted that in the latter embodiment, the effective aperture, as seen by the beam, changes as mirror 51 rotates. This causes the radiation incident upon the fiber to fluctuate. To avoid this, two mirrors are used in the embodiment illustrated in FIG. 6. One mirror 61 is fixed in position. The other mirror 62 rotates. Radiant energy from a signal source 60 is directed through an aperture 66 in fixed mirror 61 and onto a fiber 65. With the surface of mirror 61 oriented at a constant angle other than 90 degrees to the direction of the beam, the intensity of the beam remains constant, and the backscattered radiation, reflected by mirror 61, is redirected onto the surface of the rotating mirror 62 which is positioned slightly to the side of fiber 65. The rotation of mirror 62 sweeps the backscattered radiation pattern past a photoresponsive device 63 which converts the received radiation into a time-varying electrical signal. Signal processor 64 analayzes the signal and utilizes it in a prescribed manner.

In each of the above-described embodiments, the backscattered radiation pattern is first converted to a time-varying optical signal by a rotating mirror and then to a time-varying electrical signal by a photodiode. In the embodiment shown in FIG. 7, the first conversion step is eliminated along with the rotating mirror. In this embodiment, the incident radiation from CW laser 67 is projected onto a fiber 69 through a beam splitter 68. The backscattered radiation similarly impinges upon beam splitter 68 and is redirected towards a scanning photodiode 58. The latter directly converts the backscattered radiation intensity pattern into a time-varying electrical signal which is then coupled to a signal processor 59.

As indicated hereinabove, the information obtained from the backscattered radiation pattern can be used in a variety of ways. For example, a fiber sample can be inspected to determine its refractive index and its diameter and, thereby, ascertain its suitability for some particular application. Alternatively, the fiber parameters can be monitored during the manufacturing stage, and the resulting information used to control the manufacturing process. For this latter application, feedback means are provided between the signal processor and the fiber pulling control mechanism for controlling the pulling rate or other function.

Whatever the application, the general function of the signal processor is to obtain a measure of $L_m$ and/or $\Delta L$, (or $\Delta F$) and to convert these measurements into either a direct indication of the fiber parameters, or into a signal for controlling a processing step in the manufacture of the fiber.

Figure 8:
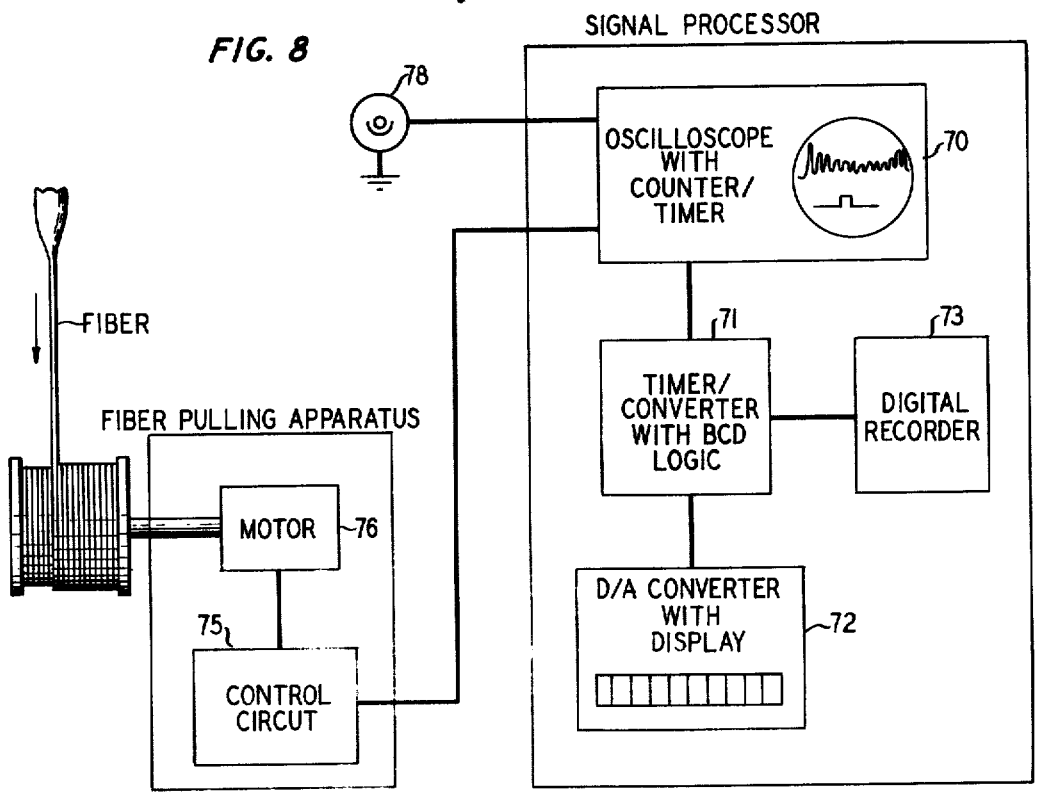
FIG. 8 shows, in greater detail, the signal processor of FIGS. 5, 6 and 7.

FIG. 8, now to be described, shows in block diagram a specific embodiment of a signal processor for achieving the above-described results. For convenience, the various components illustrated are identified by reference to commercially available apparatus. Specifically, the signal processor shown in FIG. 7 comprises: an oscilloscope 70 (Tektronix No. 7704A) equipped with a Universal Counter/Timer (Tektronix No. 7D15); a standard Timer/Counter with BCD logic 71 (Hewlett-Packard No. 5304A); a digital-to-analogue converter 72 (Hewlett-Packard No. 5309 D-A Converter); and, optionally, a digital recorder 73 (Hewlett-Packard No. 5055A). Also included in FIG. 8 for purposes of illustration, is the fiber pulling control apparatus 74 comprising a signal integrating circuit 75 and a drive motor 76.

Figure 9:
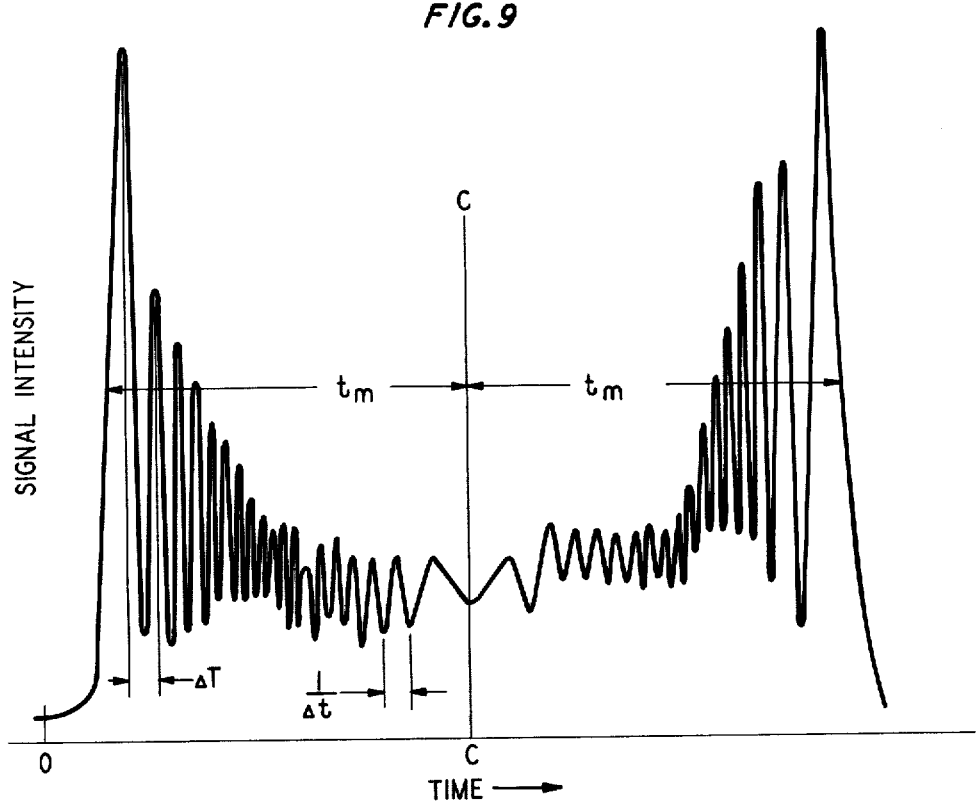
FIG. 9 shows the backscattered radiation pattern of an unclad optical fiber as a function of time.

In operation, the output signal derived from photodetector 78 is coupled to oscilloscope 70 which displays a signal indicative of the backscattered radiation pattern projected onto photodetector 78 in the manner described in connection with either FIGS. 5, 6 or 7. FIG. 9 shows, in greater detail, a typical backscattered radiation intensity pattern as a function of time. The pattern is symmetrical about the center C–C', and includes the two end intensity peaks, and the intervening intensity maxima and minima. The time $t_m$, measured to the half-intensity point along the curve, is proportional to the distance $L_m$ on the spatial pattern shown in FIG. 2, and is inversely proportional to the angular velocity of the rotating screen or mirror used to generate the signal. The intervals $\Delta t$, between adjacent minima, and $\Delta T$ are similarly related to the distances $\Delta L$ and $\Delta F$ in FIG. 2. These time intervals are accurately determined by means of a gate pulse which is simultaneously displayed on the scope screen. For example, in accordance with one method of obtaining a measure of the fiber diameter, the ends of the pulse are aligned with two adjacent intensity minima (or maxima). For the particular instruments referred to, the corresponding time interval $\Delta t$ is then automatically displayed directly on the scope screen. In order to be able to utilize this information, the oscilloscope produces an output pulse of width $\Delta t$ for each sampling of the fiber. In the instant application, the resulting series of pulses, produced by the continuous sampling of the fiber, are coupled to a control circuit 75 whose output voltage is inversely proportional to $\Delta t$. This voltage is, in turn, applied to motor 76 which controls the fiber pulling rate. If, for any reason, motor 76 is running too slowly, the fiber diameter will tend to increase, thus decreasing the pulse width $\Delta t$, and increasing the voltage applied to motor 76. This higher voltage will, in turn, increase the fiber pulling velocity, thus, reducing the fiber diameter to its proper size. Conversely, too high a pulling velocity will result in a thinner fiber and a broader pulse which will lower the voltage applied to the motor and, in turn, lower the pulling velocity.

A permanent record of the fiber parameters can be made by simultaneously coupling the output pulse train to timer/counter 71 which measures the pulse width. The output of the counter is then permanently recorded by the digital recorder 73. In addition, the counter output is coupled to digital-to-analogue converter 72 and the relevant fiber parameter (i.e., diameter or refractive index) displayed directly.

While only one signal processor has been shown, it is apparent that two processors can be used, one to measure $t_m$, and the other to measure $\Delta t$ or $\Delta T$, and both fiber parameters, $n$ and $a$, measured simultaneously.

Figure 10:
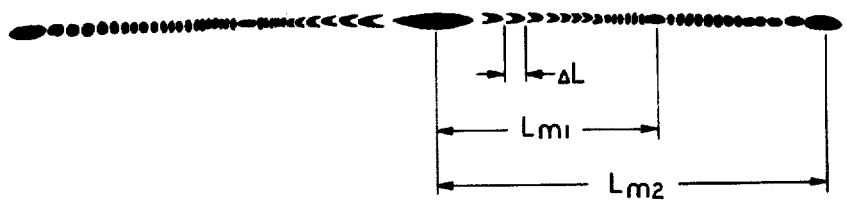
FIG. 10 shows the backscattered radiation pattern obtained from a clad optical fiber.

While the case of an unclad fiber of uniform refractive index has been considered for purposes of explanation, the above-described techniques can also be used as a means of monitoring and measuring more complicated fiber configurations. This is so inasmuch as the basic structure of the backscattered radiation pattern remains very similar for all of the various fiber configurations of interest. For example, FIG. 10 shows the backscattered radiation pattern of a clad fiber having a uniform core index $n_c$ and a cladding index $n_{cl}$ less than $n_c$. This pattern is characterized by two intensity peaks located at distances $L_{m1}$ and $L_{m2}$, respectively, from the pattern center. The first peak is proportional to $n_c$ and the ratio of the core diameter to the cladding diameter. However, as a practical matter the core index for a particular fiber is generally known. Thus, $L_{m1}$ is basically a measure of the ratio of the diameters. $L_{m2}$ is proportional to the cladding index, while $\Delta L$, the distance between adjacent intensity minima (or maxima) is proportional to the total fiber diameter. Hence, a measurement of $L_{m1}$ and $\Delta L$ provides all the information necessary to determine the core diameter and the cladding thickness.

Figure 11:
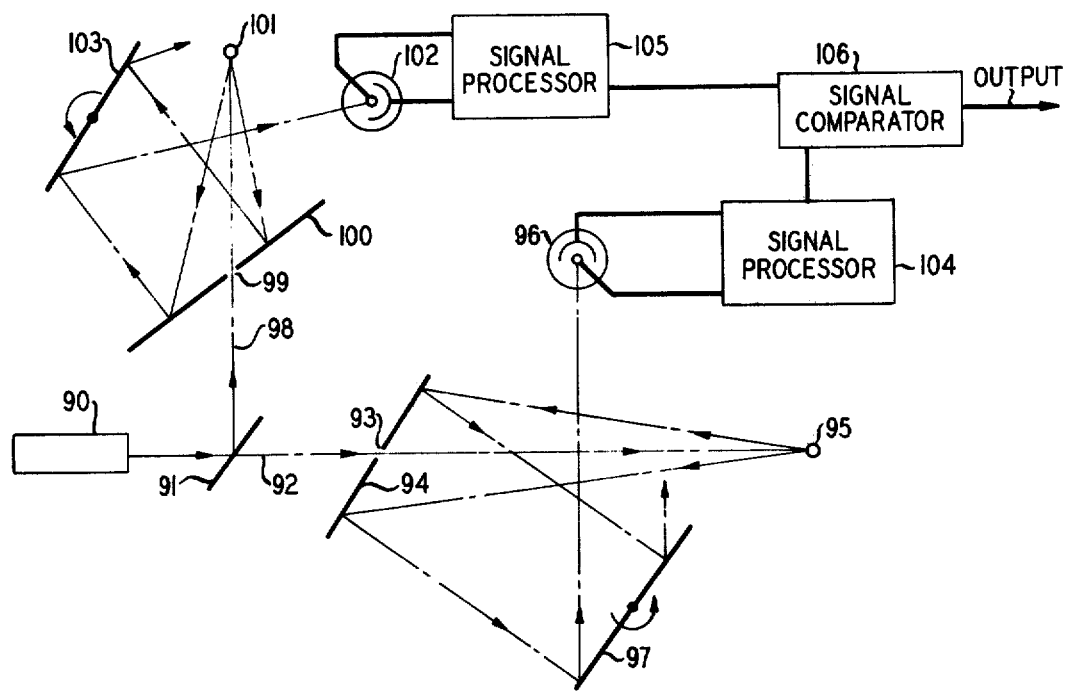
FIG. 11 shows an arrangement comparing the backscattered radiation patterns of a reference rod and of a sample rod.

In the case of a clad fiber with graded index core, the backscattered radiation pattern provides information for determining an equivalent core index and an equivalent core diameter. In the case of these more complicated fiber configurations, the preferred procedure to be followed is to generate backscattered radiation patterns from a reference fiber, having known parameters, and from a sample fiber whose parameters are to be monitored. The signals produced by these two radiation patterns are then compared and a difference signal generated. The difference signal, if it exceeds a certain specified maximum, can then be used to control or terminate the fabrication process, or simply to produce an indication of such difference. Such a system, illustrated in FIG. 11, comprises a source of radiant energy 90, whose output is divided into two components 92 and 98 means of a beam splitter 91. One beam component 92, is directed through an aperture 93 in mirror 94 and onto the transparent rod to be measured 95. The backscattered radiation produced thereby is, as described hereinabove, reflected off mirror 94 and onto photodiode 96 by a rotating mirror 97.

Simultaneously, the other beam component 98 is directed through an aperture 99 in mirror 100 and onto a segment of reference rod 101. The resulting backscattered radiation produced is similarly reflected off mirror 100 and onto photodiode 102 by a mirror 103 rotating in synchronism with mirror 97.

The two photodiode signals are coupled, respectively, to two signal processors 104 and 105. The latter are adjusted to measure any of the rod parameters as described hereinabove. The resulting signals produced by the processor are then compared in a comparator circuit 106 whose output signal is a function of the difference between the measured reference rod parameter and the measured sample rod parameter. The output signal can then be used in any of the ways indicated above.

While the invention has been described with reference to optical fibers and means for controlling the parameters of such fibers, it will be recognized that the principles of the invention can be applied more generally to the measurement of other types of transparent dielectric rods.

In addition, signal sources other than CW lasers can be used to illuminate the rod to be measured. For example, if only the refractive index is to be measured, any broadband, incoherent signal source can be used. For diameter measurements, on the other hand, a narrowband signal is required. Because of its high intensity, and very narrow bandwidth, a laser source is naturally preferred but not necessarily essential.

Thus, in all cases it is understood that the above-described arrangements are illustrative of only a small number of the many possible specific embodiments which can represent applications of the principles of the invention. Numerous and varied other arrangements can be readily devised in accordance with these principles by those skilled in the art without departing from the spirit and scope of the invention.

What is claimed is:

1. The method of controlling the diameter of an optical fiber comprising the steps of:
   illuminating said fiber with the beam from a CW laser;
   converting the backscattered radiation pattern produced by said illuminated fiber into a time-varying electrical signal;
   generating a pulse train whose pulse width equals the time interval between selected adjacent minima or maxima along said electrical signal;
   and using said pulse train to control the rate at which said fiber is being pulled.

2. A method of measuring the refractive index of a transparent rod comprising the steps of:
   illuminating said rod with a beam of radiant energy;
   converting the backscattered radiation pattern produced by said illuminated rod into an electrical signal whose intensity variations, as a function of time, correspond to the spatial variations of said radiation pattern;
   and measuring the time interval between the two end intensity peaks of said electrical signal.

3. A method of measuring the cross-sectional dimension of a transparent rod comprising the steps of:
   illuminating said transparent rod by means of a beam from a narrow band signal source;
   generating a time varying electrical signal by means including a radiation detector located so as to respond to the spatial variations of the backscattered radiation pattern produced by said illuminated rod;
   measuring a time interval between selected points along said electrical signal;
   and converting said measured time interval into an indication of the rod cross-sectional dimension, where said indication is proportional to $h^2(1-n/2)$, where $h$ is the axial distance traversed by said radiation between said rod and said detector, and $n$ is the refractive index of the rod material.

4. The method according to claim 3 wherein said signal source is a CW laser.

5. The method according to claim 3 wherein the time interval measured is that between adjacent intensity minima.

6. The method according to claim 3 wherein the time interval measured is that between adjacent intensity maxima.

7. A method of measuring the cross-sectional dimension of a transparent rod comprising the steps of:
   illuminating said transparent rod by means of a beam from a narrow band signal source;
   generating a time varying electrical signal by means including a radiation detector located so as to respond to the spatial variations of the backscattered radiation pattern produced by said illuminated rod;
   measuring the time interval corresponding to the distance between the two end intensity peaks of said pattern;
   and converting said measured time interval into an indication of the rod cross-sectional dimension, where said dimension $a$ and said measured time interval $\Delta T$ are related by $\Delta T \approx \tan [2.1 \times 10^5 (H/48) (\lambda/a)]$, where $\lambda$ is the wavelength of the illuminating beam, $H=(9(4-n^2)^{1/2}/4(n^2-1)^{3/2})$, and $n$ is the refractive index of the rod material.

8. A method of measuring the parameters of a transparent rod having an inner core of a first material surrounded by a cladding of a second material having a lower refractive index, comprising the steps of:
   illuminating said transparent rod by means of a beam from a narrow band signal source;

generating a time varying electrical signal by means including a radiation detector located so as to respond to the spatial variations of the backscattered radiation pattern produced by said illuminated rod, where said pattern is characterized by a plurality of intensity maxima and minima spaced apart a distance $\Delta L$, a first intensity peak at a distance $L_{m1}$ from the center of said pattern, and a second intensity peak at a distance $L_{m2}$ from said pattern center; and converting said measured time intervals into indications of said rod parameters, where the time intervals proportional to $L_{m1}$, $\Delta L$ and $L_{m2}$ are proportional, respectively, to the ratio of the core diameter to the total rod diameter, the total rod diameter, and to the cladding index.

* * * * *